3,180,754
**PROCESS FOR PRODUCING HYDROPHOBIC AND/
OR ORGANOPHILIC SILICEOUS MATERIALS**
Ellsworth G. Acker, Baltimore, Moises G. Sanchez, Severna Park, and David E. Kramm, Laurel, Md., assignors to W. R. Grace & Co., New York, N.Y., a corporation of Connecticut
No Drawing. Filed Jan. 31, 1962, Ser. No. 170,228
6 Claims. (Cl. 117—100)

This invention relates to hydrophobic and organophilic silicas and silicates. In one specific aspect, it relates to a process of preparing hydrophobic, organophilic fine-sized silicas and silicates by fixing an insoluble organic coating on the surface of these materials.

The use of materials of this type, clays and silicas as grease thickeners and reinforcing agents for rubbers, plastics, and polymers, is well known. Different types of clays and silicas are used to vary the properties of the filled rubbers and plastics. The introduction of hydrophobic and organophilic silicas provided a new source of fillers for these materials in that their hydrophobic or organophilic character allows them to be wet more easily by the organic material in which they are used as fillers. Hydrophobic and organophilic clays are also useful as suspending aids for pigments in paints and as viscosity control agents in organic coating systems.

It has been previously disclosed that siliceous materials having acidic sites on the surface can be coated with alcohols through a reaction between the hydroxy group of the alcohols and the acidic sites. It is also well known that certain organic coatings on silica render the silicas organophilic rather than hydrophobic. For example, allyl alcohol and octene react with fine-sized silica to give an organophilic silica. These materials are made by reacting the organic compound with the fine-sized silica in an autoclave.

We have found that silica can be coated with an organic surface which renders the material hydrophobic and organophilic by reacting organic aldehydes with silica under suitable conditions.

Broadly speaking, the invention comprises the process of preparing hydrophobic and organophilic silicas and silicates by treating these fine-sized materials with certain aldehydes at elevated temperature under pressures above atmospheric for the period of time necessary to prepare the hydrophobic and organophilic product in the colloidal and supercolloidal state of sub-division, having a surface area of 1 to 900 square meters per gram. The material to be coated may be any fine-sized amorphous silica and certain clays. Suitable clays and siliceous materials include kaolinites, asbestos, and vermiculites.

The choice of the aldehyde used in preparing the coating depends on the physical properties of the aldehyde at room temperature. Since the aldehyde must have a sufficient vapor pressure under the conditions of the reaction, the choice of aldehydes is limited to aldehydes having 3 to 10 carbon atoms. The preferred aldehydes are those having 4 to 7 carbon atoms. Particularly good results have been obtained using butyraldehyde and valeraldehyde and heptaldehyde.

The most important single variable in our novel method of preparing the hydrophobic and organophilic products is the temperature range. This again depends on the particular aldehyde used. When valeraldehyde is used, satisfactory results are obtained at temperatures from about 125° C. to 250° C. A temperature of about 135° C. is preferred. Under these temperature conditions, the pressure ranges from 35 to about 200 p.s.i.g. Preferred results are obtained when the pressure and temperature are controlled to result in a pressure of about 35 p.s.i.g.

Another important variable is the ratios of reactants. On the preparation of hydrophobic silica, it has been found that weight ratios of valeraldehyde to silica, for example, may vary from greater than 11 to 1 to 6 to 1.

The time of the reaction again varies with the particular aldehyde used and the temperature. Satisfactory results have been obtained in preparing the valeraldehyde coated silica, for example, by heating the mixture for a period of about four hours at a temperature of 135° C. Under these conditions, a pressure of 35 p.s.i.g. is built up in the reaction vessel. Although the conditions set up above were selected for the preparation of hydrophobic silica using valeraldehyde as one of the reactants, the same broad limits are obtained when other aldehydes are used to prepare hydrophobic and/or organophilic coatings on fine-sized silicas and clays.

After the coating is firmly affixed on the base, the coated product must be degassed to remove unreacted aldehyde by vacuum degassing at elevated temperatures or by nitrogen degassing at these same temperatures (150–250° C.). In the valeraldehyde case, for example, satisfactory results were obtained when the materials were vacuum degassed at 200 to 250° C. or nitrogen dried at temperatures in the same range. The hydrophobic and organophilic properties of the product were determined using the following technique: A 1 gram sample of the coated siliceous material is placed in a beaker containing 100 ml. of water maintained at about 100° C. If the coated material is not wet by the boiling water over a period of at least 30 minutes, it is said to be hydrophobic. Another sample of the material is then added to a 30 ml. test tube, 6 inches long, 10 ml. of water and 10 m. of normal butanol are then added. The tube is stoppered and given 5 vigorous vertical shakes. It will be seen that the butanol forms a separate layer which floats on the water. The siliceous material which rises above the interface and passes into suspension in the butanol layer upon gentle stirring is considered organophilic according to this test.

The invention is further illustrated by the following specific but non-limiting examples.

*Example I*

A charge of 8 grams of a commercial fine-sized silica having an average particle size of 10 to 20 millimicrons prepared by the flame decomposition of silicon tetrafluoride was placed in a porous holder in an autoclave having a capacity of about 250 ml. A total of 100 ml. of valeraldehyde was added and the autoclave was heated to a temperature of 200° C. for a period of about 4 hours. The pressure in the autoclave increased to about 200 p.s.i.g. At the end of this time, the unreacted valeraldehyde was removed and the product was degassed at a temperature of about 200 to 250° C. under vacuum. The coated product had the following analysis:

Total volatiles _____ 11.34
Percent carbon _____ 7.20
Percent fluorine _____ 0.16

Total volatiles were determined by heating a weighed sample at 1750° C. for ½ hour, cooling the sample to room temperature and reweighing. Carbon was determined by a standard combustion method such as Liebig's method. The resulting polymer coated silica was determined to be hydrophobic by the boiling water test described previously. The coated silica also passed into the butanol layer in the organophilic test.

*Example II*

A charge of 15 grams of a commercial finely-divided silica having an average particle size of 20 to 40 millimicrons and a surface area of 167 m.$^2$/g. was added to the autoclave in a porous holder as described in Example I. A 100 ml. charge of valeraldehyde was added to the autoclave and the temperature was increased to 225° C. The pressure increased to 220 p.s.i.g.

At the end of a four-hour period, the autoclave was cooled and unreacted valeraldehyde was removed from the autoclave. The product was degassed by passing nitrogen through the autoclave heated at a temperature of 200 to 250° C., then cooled in the presence of nitrogen. The analysis of the product was as follows:

| | |
|---|---|
| Total volatiles | 10.51 |
| Percent carbon | 6.80 |
| Percent fluorine | 0.0 |

The total volatiles and carbon were determined using the techniques described in Example I. The resulting coated silica was determined to be hydrophobic by the boiling water test and was also found to be organophilic.

Example III

The product was prepared using butyraldehyde as the coating agent rather than valeraldehyde. In the first of these runs, a charge of 8 grams of a commercial fine-sized silica prepared by the flame decomposition of silicon tetrafluoride was added to an autoclave as described in Example I. A total of 100 ml. of butyraldehyde was added and the autoclave heated to a temperature of 200° C. for a period of about 4 hours. During this period the pressure in the autoclave rose to 300 p.s.i.g. The coated silica, after degassing, had the following analysis:

| | Percent |
|---|---|
| Total volatiles | 9.0 |
| Percent carbon | 9.0 |

The total volatiles and carbon were determined using the techniques described in Example I. The resulting hydrophobic silica was not wet with boiling water during a 30 minute period.

Example IV

Another finely-divided silica material was prepared with butyraldehyde. In this run 15 grams of a commercial finely-divided silica having an average diameter of 20 to 40 millimicrons and a surface area of 167 m.²/g. was added to the autoclave described in Example I. A 100 ml. charge of butyraldehyde was added and the autoclave was heated to a temperature of about 200° C. for a period of about 4 hours. During this period the pressure in the autoclave increased to about 300 p.s.i.g. At the end of this period, the excess butyraldehyde was removed from the autoclave and the product was dried by vacuum degassing. The analysis of the product was as follows:

| | Percent |
|---|---|
| Total volatiles | 7.7 |
| Percent carbon | 6.6 |

The resulting hydrophobic silica was not wet with boiling water during a period of 30 minutes.

Example V

Another preparation was made using valeraldehyde with a commercial fine-sized silica. The purpose of this run was to determine whether a suitable product could be made at a temperature of 135° C. and if the process would give satisfactory results when scaled up to prepare larger amounts of material.

In this run 500 grams of a commercial fine-sized silica having an average diameter of 10 to 20 millimicrons and a surface area of about 200 square meters per gram was added to a 5-gallon autoclave-type sterilizer. A 7,000 ml. charger of valeraldehyde was added to the autoclave which was then heated to a temperature of about 135° C. for a period of 4 hours. During this period, the pressure in the autoclave increased to about 35 p.s.i.g. At the end of the reaction period, the excess valeraldehyde was removed from the autoclave and the product was dried by nitrogen degassing in a stainless steel drying tower. This degassing was carried out at 250° C. over a period of 8 hours. After 4 hours at 250° C., aggregates of the product were broken up to hasten the degassing process. The product was then degassed for an additional 4 hours. The analysis of the product was as follows:

| | | |
|---|---|---|
| Total volatiles | percent | 17.7 |
| Percent carbon | | 9.4 |
| Percent fluorine | | 0.23 |
| Bulk density | grams/cc | 0.12 |
| Particle size | millimicrons | 10 to 20 |
| Surface area | M sq./gram | 188 |

The resulting hydrophobic silica was not wet with boiling water during the period of at least 30 minutes. The material was found to be organophilic.

Example VI

The nature of the coating on this silica was determined using the following technique: A sample of the valeraldehyde treated silica, the product described in Example II, was intimately mixed with powdered solid carbon dioxide. Next, a 1 to 1 concentrated solution of hydrofluoric acid and water was added. The Dry Ice moderated the reaction of the silica and hydrofluoric acid to permit low temperature evolution of silicon tetrafluoride. The reaction was carried out in polyethylene equipment. After volatilization of the silicon tetrafluoride, water was added to dilute the excess hydrofluoric acid. The solution was then transferred to a glass separatory funnel. Diethylether readily extracted the organic material from the aqueous phase. The ether layer was washed with distilled water until neutral and the aqueous acid layer was later discarded. After evaporation of the ether, an oily liquid was obtained having a boiling point of 266° to 269° C. This product along with similar products isolated by scaled-up versions of the above-procedure was reserved for analysis.

Another sample of this material was used to determine the percentage of organic matter present in the coated silica product. A sample of the coated material was vacuum dried to constant weight at 105° C. The sample was then ashed in a Vycor crucible. A 3.0012 gram sample of the coated silica gave 2.0044 grams of silica representing an ash content of 66.8%. It is estimated that the organic coating represented therefore about 33.2% of the sample. This figure checked the carbon content of the sample which was recorded as 19.6% carbon.

The oily liquid samples recovered by the hydrofluoric acid isolation method described above were analyzed. In the first step of the analysis the product was chromatographed over alumina with the benzene methanol gradient elution. The infra-red spectra of the chromatographed material showed an ester carbonyl adsorption as well as the C—O—C stretch vibrations typical of esters. A sample of this material was submitted for elemental analysis. This analysis was as follows: percent carbon 71.38, 71.03; percent hydrogen 11.76, 11.88; percent oxygen 17.1.

The sample was tested for carboxyl, hydroxyl, ester, unsaturation and carbonyl functional groups. The test for ketone and aldehydic carbonyl groups was negative. The test for esters gave results of 2.73 and 2.79 milliequivalents of ester per gram. The hydroxyl group determination gave a result of 1.41 milliequivalents per gram of hydroxyl group in the chromatographed fraction. This determination was made using the standard quantitative acetylation techniques. The unsaturation was determined using the bromide-bromate titration technique. The results showed 1.53 milliequivalents per gram present as unsaturated groups. A combination of all of the data indicates that the emperical formula of the coating was $C_{20}H_{40}O_4$. The molecular weight of this material was determined as 344.52. It was definitely shown to be a hydroxyl ester structure.

It is apparent from the analytical data presented above that the coating on the product is a hydroxy ester of high molecular weight and that the treatment described in the examples resulted in the formation of this hydroxy ester attached to the surface of the silica particle.

Obviously, many modifications and variations of the invention, as herein above set forth, may be made without departing from the essence and scope thereof, and only such limitations should be applied, as indicated in the appended claims.

What is claimed is:

1. A process for treating siliceous inorganic substrate materials selected from the group consisting of fine sized silicas and clays in the collodial and supercolloidal state of subdivision, having a surface area of 1 to 900 square meters per gram to render said materials hydrophobic which comprises:
    (a) heating said material with an aldehyde selected from the group consisting of butyraldehyde, valeraldehyde, and heptaldehyde,
    (b) in the weight proportions of aldehyde to silica of 11 to 1 to 6 to 1, to a temperature of 125° C. to 250° C. and at a pressure of 35 to 200 p.s.i.g., for a period of about 4 hours,
    (c) followed by degassing at a temperature of 150° C. to 250° C. under vacuum,
    (d) and recovering the product hydrophobic material.

2. A process for treating siliceous inorganic materials selected from the group consisting of fine sized silicas and clays in the colloidal and supercolloidal state of subdivision having a surface area of 1 to 900 square meters per gram to render said materials hydrophobic which comprises:
    (a) heating said material with an aldehyde selected from the group consisting of butyraldehyde, valeraldehyde, and heptaldehyde,
    (b) in the weight proportions of aldehyde to silica of 11 to 1 to 6 to 1,
    (c) to a temperature of 125° C. to 250° C. and at a pressure 35 to 200 p.s.i.g. for a period of about 4 hours,
    (d) followed by degassing at a temperature of about 150° C. to 250° C. in the presence of a stream of nitrogen,
    (e) and recovering the product hydrophobic materials.

3. A process according to claim 2 wherein the aldehyde is butyraldehyde.

4. A process according to claim 2 wherein the aldehyde is valeraldehyde.

5. A process according to claim 2 wherein the aldehyde is heptaldehyde.

6. A process for treating an amorphous silica in the colloidal state of subdivision having a surface area of about 1 to 900 square meters per gram which comprises:
    (a) heating said silica with valeraldehyde,
    (b) in the weight ratios of valeraldehyde to silica of 11 to 1 to 6 to 1,
    (c) to a temperature of about 135° C. and at a pressure of about 35 p.s.i.g. for a period of about 4 hours,
    (d) followed by degassing at a temperature of 200 to 250° C. under vacuum,
    (e) and recovering the product hydrophobic silica.

References Cited by the Examiner

UNITED STATES PATENTS

| | | | |
|---|---|---|---|
| 2,314,181 | 3/43 | Winterkorn | 117—100 |
| 2,657,149 | 10/53 | Iler | 117—123 |
| 2,921,028 | 1/60 | Stratton | 262—28 X |

FOREIGN PATENTS

| | | |
|---|---|---|
| 216,036 | 6/58 | Australia. |
| 571,373 | 2/59 | Canada. |

OTHER REFERENCES

Chessick: Colloidal Dispersions, American Ink Maker, August 1961, pp. 33, 34, 37, 62, and 63.

RICHARD D. NEVIUS, *Primary Examiner.*